A. R. BREWER.
KEYHOLE SAW.
APPLICATION FILED JAN. 24, 1917.
1,240,173.
Patented Sept. 18, 1917.
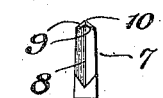
Fig. 1.
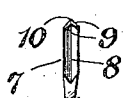
Fig. 2.
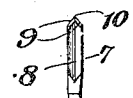
Fig. 3.
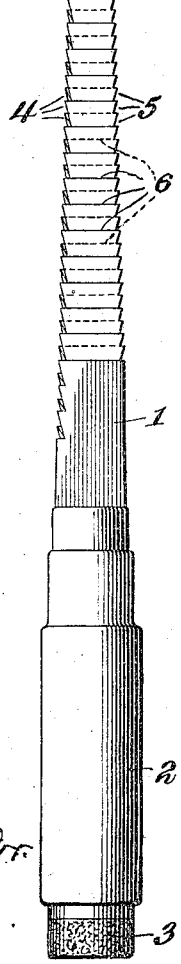
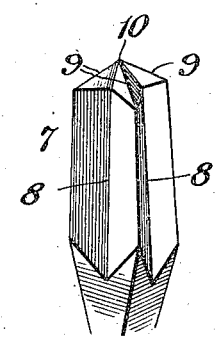
Fig. 4.
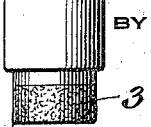
WITNESSES
Howard D. Orr.
F. J. Chapman.
A. R. Brewer,
INVENTOR,
BY
E. G. Siggers
ATTORNEY

UNITED STATES PATENT OFFICE.

ALDEN R. BREWER, OF NORTHPORT, WASHINGTON, ASSIGNOR OF ONE-HALF TO CHARLES H. MOORE, OF NORTHPORT, WASHINGTON.

KEYHOLE-SAW.

1,240,173.  Specification of Letters Patent.  Patented Sept. 18, 1917.

Application filed January 24, 1917. Serial No. 144,252.

*To all whom it may concern:*

Be it known that I, ALDEN R. BREWER, a citizen of the United States, residing at Northport, in the county of Stevens and State of Washington, have invented a new and useful Keyhole-Saw, of which the following is a specification.

This invention has reference to keyhole saws, and its object is to provide a structure of saw of the nature of a keyhole and compass saw having a much wider extent of use than the ordinary key hole saw.

The invention provides a saw susceptible of manufacture from saw plate stock and requiring no adjuncts, in the form of extra tools, for producing keyholes or for cutting out material in the manner of an ordinary compass saw, with the advantage that the saw may be employed equally well with or crosswise of the grain of the wood being cut, which advantage is not present in either a keyhole saw or a compass saw of commercial type.

The invention will be best understood from a consideration of the following detailed description, taken in connection with the accompanying drawings, forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a plan view of the saw looking at one broad face of the blade.

Fig. 2 is a view of the saw taken at right angles to the showing of Fig. 1, and illustrating the cross cut edge of the blade.

Fig. 3 is an edge view of a portion of the blade as seen from the side opposite from that shown in Fig. 2.

Fig. 4 is a perspective view of the boring end or point of the blade on an enlarged scale.

Referring to the drawings there is shown a saw blade 1 which may be formed of a flat piece of steel of suitable length of substantially even thickness throughout and tapering toward one end. Applied to the larger end of the blade is a handle 2, which may be a chisel handle provided with a leather or other suitable cap 3 to protect the handle, customarily made of wood, when it is desired to apply blows to the handle by means of a mallet or hammer. In general shape the saw blade 1 corresponds to a keyhole saw, but differs in construction from a keyhole saw in many particulars.

Opposite edges of the blade 1 are formed with longitudinal double series of saw teeth 4, 5, respectively, with the teeth of each double series having their cutting points at the opposite faces of the saw blade, and the teeth at one face alternating with those at the other face of the saw blade. The opposite faces of the blade are each formed with a single series of chisel-like teeth 6 merging into the teeth 4 and 5. The teeth 4 have their cutting edges set at an angle to the length of the saw, so as to have a suitable rake and angle to operate crosswise of the grain of wood, that is, to serve as cross-cut teeth. The teeth 5 may have their cutting edges perpendicular to the length of the saw and are of a suitable shape to cut with the grain and so operate as the teeth of a rip saw.

The teeth 6 are as wide at their cutting edges as the width of the saw where they are located, and consequently the widths of the teeth 6 progressively lessen from the handle end of the saw toward the point end thereof. The cutting edges of the teeth 6 are substantially perpendicular to the length of the saw, and the sides of each tooth bevel toward the center line of the saw and merge into the teeth 4 and 5, thus imparting to the teeth 4 and 5 a desirable set or clearance, so that such teeth will not choke, and the saw will not bind in the kerf formed by the teeth 4 or 5, as the case may be. This avoids any necessity of setting the teeth 4 and 5, since the bevel of the teeth 6 toward the longitudinal center line of the saw provides for the clearance.

The saw blade is prolonged beyond the series of teeth 4, 5 and 6 in the form of a cutting or boring point 7 having longitudinal channels 8 therealong and terminating in cutting edges 9. The cutting edges 9 approach to and merge into a point 10 in the longitudinal center line of the saw blade, so that the point or terminal 7 may be employed as a boring member or as a chisel-like cutter movable straightwise into wood without turning movement, it being quite possible to drive the saw into or through a board by means of blows of a mallet applied to the end 3 of the handle 2. It is also possible to force the saw into wood by turning movements, whereby the point or tip 7 acts in the nature of a boring member.

The saw is readily manipulated to bore a hole through wood, or a hole may be bored by means of another tool and the saw may then be used after the manner of a keyhole saw to enlarge the hole either in the direction of the width of the saw or of the thickness thereof, or both.

While cross-cut teeth may be used in the direction of the length of the grain of wood, the slow cutting action of such teeth as a rip saw makes the operation tedious. The action of the saw is much facilitated by the employment of the rip teeth when sawing with the grain while the ease of cutting of the saw is much improved by the use of the cross cut teeth when cutting crosswise of the grain. The saw, therefore, is particularly valuable where it is desired to enlarge the original hole both with and across the grain, since one edge of the saw may be used for one purpose, and the other edge for the other purpose.

There are conditions where it is desirable to widen a hole through the wood, and then the teeth 6 on the side faces of the saw may be employed, the saw operating after the manner of a wood reamer.

While the saw is flat, that is, considerably wider than thick, it may be utilized for producing round holes by turning the saw about its longitudinal center line while the saw is being reciprocated.

The saw is also well adapted for use as an ordinary compass saw, with the additional advantage that it will work advantageously in cutting both across and with the grain of the wood.

The side faces of the saw provided with the teeth 6 permit the utilization of the saw as a wood rasp whether for surface or interior work. The saw is especially adapted for producing mortises since the original hole may be enlarged in any direction. The saw has many other uses, for it may be used as a coping saw, or a lettering saw, or a broaching saw, the saw being capable of boring operations, rasping operations and sawing operations, as well as cutting operations, simulating those of a chisel.

The saw has the further advantage of capability of being sharpened by means of a file after the manner of an ordinary saw, since all the teeth 4, 5 and 6 and the point 7 are so constructed that when dull the application of a file will sharpen them.

What is claimed is:—

1. A saw with a blade of substantially even thickness throughout and gradually tapering in width from one end toward the other, each edge of the saw blade being formed with a double series of saw teeth, and each side face of the blade being formed with a single series of teeth merging into the first-named teeth and providing clearance for the latter.

2. A saw blade of substantially even thickness throughout and gradually tapering in width from one end toward the other, one edge of the blade having a longitudinal double series of teeth constituting cross-cut teeth, and the opposite edge of the blade having a longitudinal double series of teeth constituting rip teeth, and other teeth on and extending crosswise of opposite faces of the saw blade and merging into and providing clearance for the teeth along the edges of the blade.

3. A flat saw blade of even thickness throughout and gradually tapering in width to one end, said blade having saw teeth along opposite edges and other teeth along the opposite faces and merging into and providing clearance for the teeth along the edges, and the small end of the blade having longitudinal teeth constituting a straight boring member.

4. A flat saw blade of substantially even thickness throughout and gradually tapering in width from one end toward the other, with saw teeth on opposite edges and other teeth on the side faces of the blade and extending across said faces and narrowing in width from the wide end of the blade to the narrow end thereof in accordance with the taper of the blade.

5. A relatively narrow flat saw blade of substantially even thickness throughout and gradually tapering in width from one end toward the other, said blade having a longitudinal double series of saw teeth along one edge constituting rip saw teeth and a longitudinal double series of saw teeth along the other edge constituting cross-cut teeth.

6. A relatively narrow saw blade of substantially even thickness throughout and gradually decreasing in width from one end toward the other, with the small end formed into a cutter of a width and thickness corresponding to the width and thickness of the blade at its small end, the edges of the blade being formed into saw teeth and the side faces of the blade into other teeth merging into the saw teeth and providing clearance therefor.

7. A saw blade of keyhole type of substantially even thickness throughout and gradually decreasing in width from one end toward the other, with the small end formed into a cutter of a width and thickness corresponding to the width and thickness of the small end of the blade, the edges of the blade being formed into saw teeth and the side faces of the blade being formed into other teeth merging into the saw teeth and providing clearance therefor, with the teeth on one face of the blade alternating with the teeth on the other face of the blade.

8. A saw provided with a blade of substantially even thickness throughout and gradually tapering in width toward one end and there formed into a cutting device of a width and thickness corresponding to the like dimensions of the saw blade at the small end, the blade having the opposite edges formed into double rows of saw teeth with the teeth having their cutting points adjacent to the side faces of the blade and arranged in alternation with respect to the same edge of the blade, those teeth along one edge constituting cross-cut teeth and those teeth along the other edge constituting rip teeth, and the opposite faces of the saw blade being formed into chisel-like teeth extending crosswise of the blade and progressively narrowing in width in accordance with the taper of the blade, the said teeth on one face of the blade alternating with those on the other face of the blade and merging into the teeth at the edges of the blade and providing clearance therefor.

In testimony that I claim the foregoing as my own, I have hereto affixed my signature in the presence of two witnesses.

ALDEN R. BREWER.

Witnesses:
RALPH O. JELLISON,
EUGENE M. JELLISON.

Copies of this patent may be obtained for five cents each, by addressing the "Commissioner of Patents, Washington, D. C."